Sept. 7, 1926.
A. T. CARNES
AUTOMATIC HOSE NOZZLE
Filed Oct. 7, 1925
1,598,847
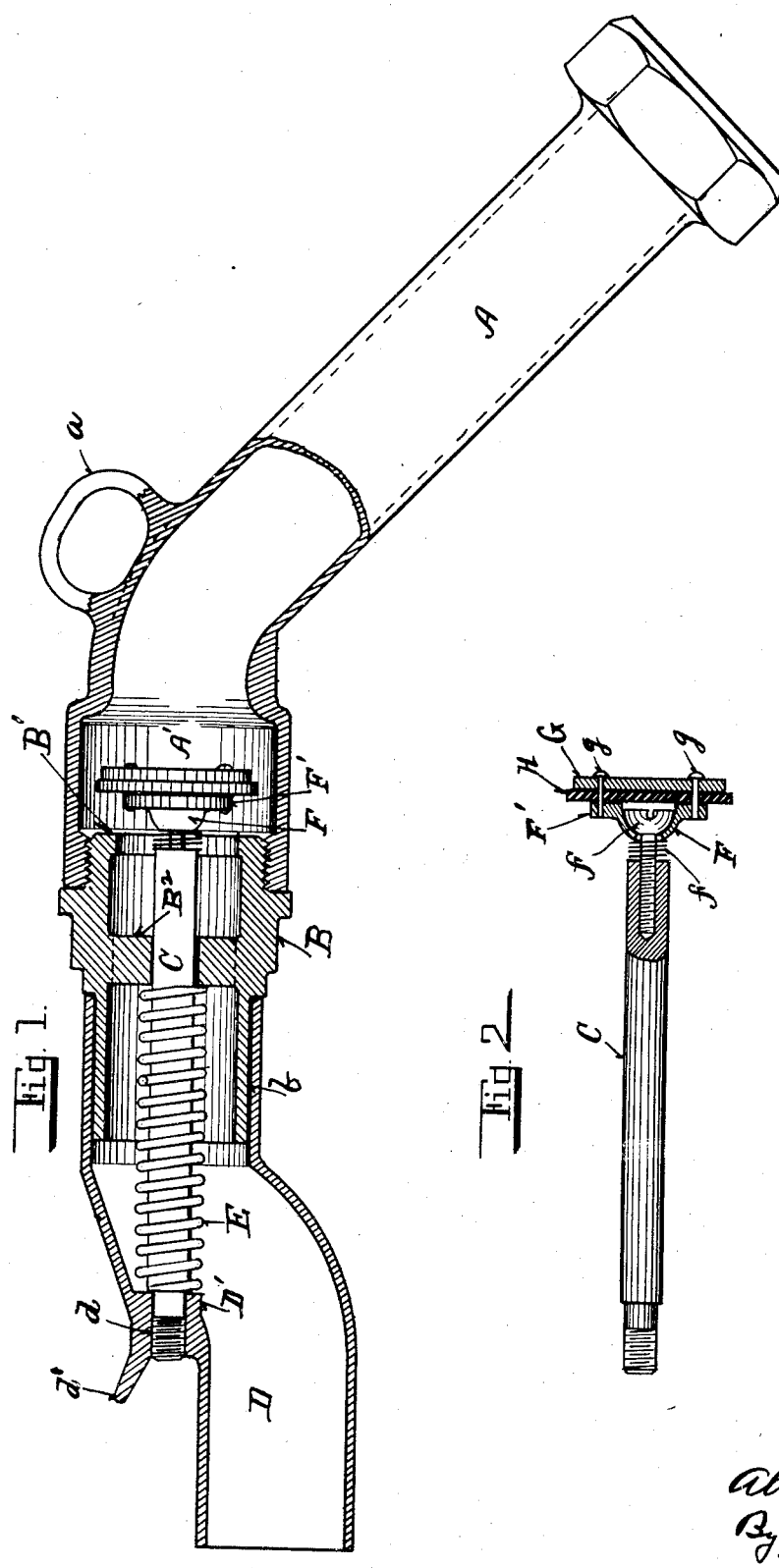
Inventor
Almus T. Carnes
By S. M. Sturgeon
Atty.

Patented Sept. 7, 1926.

1,598,847

UNITED STATES PATENT OFFICE.

ALMUS T. CARNES, OF KANSAS CITY, MISSOURI.

AUTOMATIC HOSE NOZZLE.

Application filed October 7, 1925. Serial No. 61,038.

This invention relates to hose nozzles for filling gasoline tanks of motor vehicles.

The object of this invention is to provide such a nozzle with an automatic shut off mechanism which closes when the nozzle is withdrawn from the tank. The principal features of this invention consist of a valve housing containing a valve seat, a valve secured to a valve-stem by means of a spring-pressed ball and socket joint, and a spring actuated nozzle member slidably mounted on said valve housing to which said valve spring is secured.

These and other features of my invention are hereinafter described and pointed out and are illustrated in the accompanying drawings, in which:

Figure 1 is a central longitudinal section, partially in elevation, of a hose nozzle embodying my invention.

Figure 2 is a longitudinal central section of the valve mechanism of my invention.

In these drawings A indicates the shank of the valve housing to which a flexible hose is secured, having thereon a loop $a$ by means of which the same can be suspended upon a suitable hook, not shown.

This shank A has a valve chamber A' to which is secured a valve-seat member B provided with an annular valve seat B'. In the tubular valve seat member B is a spider bearing $B^2$ in which is slidably mounted a valve-stem C.

Slidably mounted on the valve-seat member B by means of a telescopic joint $b$ is a nozzle member to which the valve-stem C is secured.

The nozzle member D is off-set from the axis of the valve-seat member B, and the wall thereof is provided with a boss D' which is on the axis of the valve-stem C, and said boss D' is provided with a screw threaded opening $d$ into which the valve-stem C is secured.

Between the boss D' and the spider bearing $B^2$ in the valve-seat member B a spring E is placed upon the valve-stem C, so that said spring is compressed when the nozzle member D is in the position shown in Fig. 1, with the valve-stem pushed inwardly thereby as shown in Fig. 1.

Secured upon the valve-stem C, by means of a ball-and-socket joint F, see Fig. 2, is a disc valve consisting of a disc F' having a semi-spherical socket therein, in which is placed a screw having spherical head $f$ which fits said socket, and is secured into the end of the stem C. A spring $f'$ is on the screw $f$ between the end of the stem C and the semi-spherical socket F by means of which the socket F is maintained in close contact with the spherical head of the screw $f$.

Secured to the socket-disc F is a disc G by means of rivets or screws $g$, and securely clamped between the discs F' and G is a disc of packing material H which engages the valve-seat B' of the member B. It will be obvious that this ball-and-socket connection, allows the disc H to adjust itself upon the valve seat at any angle which may be necessary to ensure a perfect fit to render the joint between impervious to the escape of fluid therethrough, also that the valve when raised off of its seat to retain the angle to which it has been adjusted by the valve-seat, because the spring $f'$ produces sufficient friction in the ball-and-socket joint F to hold the valve steady on the stem C when the valve is raised free from its seat.

This ball-and-socket joint is necessary because should the nozzle member D be turned on the axis of its telescopic joint $b$, and the valve thereby be rotated, when again closed upon its seat, it can adjust itself to the annular valve-seat B when again closed thereupon.

When not in use the spring E causes the nozzle member to slide longitudinally on the joint $b$ until the disc H seats upon the seat B' which closes the passage through the valve.

In operation the nozzle member D is thrust into the orifice of the tank to be filled until the projection $d'$ engages the exterior of the tank, and pressure sufficient to compress the spring E is placed thereon, which raises the valve off of its seat, so that fluid can flow through the valve-seat and thence into the tank in which the nozzle D is inserted, and the flow will continue until the pressure on the valve housing is released, when the spring E will force the nozzle member to slide on the valve housing, until the valve again closes down upon its seat B' thereby shutting off the flow of fluid therethrough.

Having thus fully described the construction and operation of my invention so that others can utilize the same, what I claim as new and desire to secure by Letters Patent is:

1. In a device of the class described, a valve housing, a valve seat member screwed into said housing, a valve stem bearing in said member, a nozzle member telescopically mounted on said valve seat member and having a laterally offset discharge end, a valve stem mounted in said valve seat member, and secured to said offset portion of said nozzle member, a spring on said valve-stem between said valve stem bearing and said nozzle member, and adjustable means to secure said valve to said valve-stem.

2. In a device of the class described, a valve-stem, a hemi-spherical head thereon, a disc having a semi-spherical socket adapted to receive said head, another disc secured to said socket disc, and a disc of resilient material clamped between said discs.

3. In a device of the class described, a valve stem, a hemi-spherical head secured thereon, a disc having a semi-spherical socket adapted to receive said head, a spring arranged between said stem and said disc, and a disc of resilient material secured to said socket disc.

In testimony whereof I affix my signature.

ALMUS T. CARNES.